(12) United States Patent
Machijima et al.

(10) Patent No.: US 9,528,816 B2
(45) Date of Patent: Dec. 27, 2016

(54) POSITION SENSOR ATTACHMENT BAND

(75) Inventors: Mitsuru Machijima, Matsudo (JP); Kunihiro Suzuki, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 372 days.

(21) Appl. No.: 14/344,451

(22) PCT Filed: Aug. 30, 2012

(86) PCT No.: PCT/JP2012/072008
§ 371 (c)(1),
(2), (4) Date: Mar. 12, 2014

(87) PCT Pub. No.: WO2013/038917
PCT Pub. Date: Mar. 21, 2013

(65) Prior Publication Data
US 2014/0266167 A1    Sep. 18, 2014

(30) Foreign Application Priority Data

Sep. 12, 2011  (JP) .................................. 2011-198407

(51) Int. Cl.
*F01B 31/12* (2006.01)
*G01B 7/14* (2006.01)
*F15B 15/28* (2006.01)

(52) U.S. Cl.
CPC ............. *G01B 7/14* (2013.01); *F15B 15/2892* (2013.01)

(58) Field of Classification Search
CPC .............. F15B 15/2892; Y10T 24/1441; Y10T 24/1443; F16L 33/04
See application file for complete search history.

(56) References Cited

U.S. PATENT DOCUMENTS 4,592,576 A *  6/1986  Proctor .................. F16L 33/04
                                                            24/279
4,875,647 A   10/1989  Takagi et al.
(Continued)

FOREIGN PATENT DOCUMENTS

JP          60 188311       12/1985
JP          63 191822       12/1988
(Continued)

OTHER PUBLICATIONS

Office Action issued May 26, 2015 in Russian Patent Application No. 2014114498 (with English language translation).
(Continued)

*Primary Examiner* — Michael Leslie
(74) *Attorney, Agent, or Firm* — Oblon, McClelland, Maier & Neustadt, L.L.P.

(57) ABSTRACT

A position sensor attachment band configured to secure a position sensor on an outer periphery of the cylinder tube includes a thin plate band, the thin plate band has one or more projections that project from the inner peripheral surface of the thin plate band which are disposed at least at the end positions among the end positions located in proximity to one end and the other end of the thin plate band in the length direction and the intermediate position, and the projections are disposed at positions completely within the width of the thin plate band and accordingly at positions completely away from the both side edges of the thin plate band on both sides in the width direction, and the projections are symmetrically arranged with respect to the center in the length direction of the thin plate band.

11 Claims, 6 Drawing Sheets

(56) References Cited

U.S. PATENT DOCUMENTS 7,372,708 B2 * 5/2008 Terasaki .............. F15B 15/2892
200/275
9,194,406 B2 * 11/2015 Machijima .......... F15B 15/2892

FOREIGN PATENT DOCUMENTS

| JP | 64 47518 | 3/1989 |
| JP | 8 61316 | 3/1996 |
| JP | 2004 125150 | 4/2004 |
| JP | 2010 65839 | 3/2010 |

OTHER PUBLICATIONS

International Search Report Issued Dec. 4, 2012 in PCT/JP12/072008 Filed Aug. 30, 2012.

* cited by examiner (a)

(b)

(a)

(b)

(a)

(b)

POSITION SENSOR ATTACHMENT BAND

TECHNICAL FIELD

The present invention relates to a position sensor attachment band configured to secure a position sensor that detects an operating position of a piston which slides in the axial direction inside the cylinder tube of a hydraulic pressure cylinder or the like on a cylinder tube via a holding member.

BACKGROUND ART

When a position detection device is used to detect an operating position of a piston of a hydraulic pressure cylinder and the detected signals are used as various control signals, the position detection device is mounted on the hydraulic pressure cylinder. The position detection device is configured to detect magnetism of a permanent magnet which is mounted on the piston by using a magnetic sensitive type position sensor which is mounted on the outer surface of the cylinder tube. Various mechanisms have been used to mount the position sensor on the outer surface of the cylinder tube.

FIGS. 12 and 13 show an example of a known hydraulic pressure cylinder 30 on which a position sensor 21 is secured, and a position sensor attachment band used for securing the position sensor 21. The hydraulic pressure cylinder includes a cylinder tube 31 formed in a cylindrical shape having a cylindrical hole inside thereof, a piston housed in the cylinder tube 31 so as to be slidably movable along a center axial line L, and a piston rod 33 which is connected to the piston and extends to the outside of the cylinder tube 31. The piston moves forward and backward by alternately supplying and exhausting a pressure fluid (for example, compressed air) to and from pressure chambers which are disposed on each end of the piston through a port 36a on a rod cover 34 disposed on one end of the cylinder tube 31 and a port 36b on a head section 35 disposed on the other end of the cylinder tube 31. Further, a ring-shaped permanent magnet is mounted on the outer periphery of the piston such that the position sensor 21 detects the magnetism of the permanent magnet and output the detected signals of the operating position of the piston.

In the hydraulic pressure cylinder 30, a position sensor attachment band 10A that is used to place a holding member 20 that holds the position sensor 21 at a certain position on the outer periphery of the cylinder tube 31 generally includes a pair of opposed clamp members 11(a), 11(b) on both ends of a thin plate band 13 which is wound around the outer periphery of the cylinder tube 31 so as to clamp the holding member 20 from both sides with the holding member 20 holding the position sensor 21. The position sensor holding member 20 is clamped by the clamp members 11(a), 11(b) and is secured by screwing a mount screw 14.

The position sensor attachment band 10A in FIG. 12 is configured to allow the mounting position of the position sensor 21 to be flexibly adjustable by moving the position sensor 21 on the cylinder tube 31, and needs to have a sufficient securing force to prevent the position sensor 21 from being displaced when a force of a certain magnitude is inadvertently applied on the position sensor attachment band 10A by an operator. The securing force of the position sensor attachment band 10A is a maximum resistance of the position sensor attachment band 10A in a secured state to a force in the circumferential direction and the axial direction of the cylinder tube 31 which is applied on the position sensor attachment band 10A.

When the clamp members 11(a), 11(b) are fastened by the mount screw 14 to generate the securing force on the position sensor attachment band 10A, a tension is generated on the thin plate band 13, which generates a pressure distributed over the entire contact surface of the thin plate band 13 and the cylinder tube 31. This pressure distribution allows the securing force to be generated on the position sensor attachment band 10A. However, this securing force does not always exceed the magnitude of securing force required for the device, since the securing force is distributed over the entire contact surface of the thin plate band 13 and the cylinder tube 31. Further, the securing force of the position sensor attachment band 10A is subject to the effect of a state change such as inclination of the position sensor attachment band 10A during mounting and torsion of the position sensor attachment band 10A during tightening of the mount screw 14, which causes the securing force to be unstable.

In order to increase the securing force, providing a rubber lining on the thin plate band is known as disclosed in Patent Literature 1. When a lining made of a material such as a rubber having a high friction resistance is applied on the inner peripheral surface of the thin plate band, instability of the position sensor attachment band 10A is eliminated, thereby obtaining a high securing force. However, there are problems that it is difficult to ensure that a rubber having a uniform thickness is applied on the thin plate band, and the manufacturing cost is increased. Further, when the thin plate band is secured at the same position for a long period of time, a rubber is stuck on the cylinder tube 31, which causes a position adjustment of the position sensor attachment band 10A to be difficult.

Further, in the position sensor attachment band 10A on which the lining is applied, there is a problem that the securing state of the holding member that holds the position sensor is subject to the effect of the thickness of the lining. If the thickness of the lining is decreased, there is a risk that securing of the position sensor 21 is not stabilized due to reasons such as a gap being formed between the cylinder tube 31 and the bottom of the holding member of the position sensor 21 when the position sensor attachment band 10A is mounted on the cylinder tube 31. On the other hand, when the thickness of the lining is increased, mounting of the mount screw may be difficult, or in an extreme case, mounting of the mount screw may be impossible when the position sensor attachment band 10A is mounted on the cylinder tube 31. Accordingly, the manufacturing cost of the position sensor attachment band 10A is increased since a high accuracy is required for the thickness of the lining member and the like. Further, in the mounting structure of the position sensor in Patent Literature 1, a plurality of components such as a strip band and anti slipping rubber plate are necessary, and the increased number of components leads to increase in manufacturing cost.

CITATION LIST

Patent Literature

PTL 1: Japanese Unexamined Patent Application Publication No. 2004-125150

SUMMARY OF INVENTION

Technical Problem

It is an object of the present invention to provide a position sensor attachment band that is capable of applying a stable securing force of a sufficient magnitude to secure a position sensor and reducing the manufacturing cost with a simple manufacturing process.

Solution to Problem

According to the present invention, a position sensor attachment band configured to secure a position sensor that detects an operating position of a piston on an outer periphery of the cylinder tube is provided. The position sensor attachment band includes a thin plate band that is wound around the outer periphery of the cylinder tube and is configured such that a sensor holding member is interposed between both ends of the thin plate band and the position sensor is held by the sensor holding member, wherein the thin plate band has an inner peripheral surface that abuts against the outer periphery of the cylinder tube and one or more projections that project from the inner peripheral surface disposed at least at the end positions among the end positions located in proximity to one end and the other end of the thin plate band in the length direction and the intermediate position located at or around the center in the length direction of the thin plate band, and the projections are disposed at positions completely within the width of the thin plate band and accordingly at positions completely away from the both side edges of the thin plate band on both sides in the width direction, and the projections are symmetrically arranged with respect to the center in the length direction of the thin plate band.

In the present invention, it is desirable that the projections disposed at the end positions on one end and the other end of the thin plate band are located on a half-circumference of the cylinder tube in which the holding member is located when the thin plate band is wound around the outer periphery of the cylinder tube, and are disposed at symmetric positions with the holding member interposed therebetween.

Further, in the present invention, it is desirable that the projections are disposed at the center of the width of the thin plate band, thereby allowing the both side edges of the thin plate band in the width direction on both sides of the projections to be in pressing contact with the cylinder tube during fastening of the thin plate band on the periphery of the cylinder tube. With this configuration, it is desirable that the projections are disposed within the range of a half or less of the width of the thin plate band and accordingly a flat non-projection forming area having a width of one-fourth or more of the width of the thin plate band is provided on each side of a position of the thin plate band where the projections are formed.

The projection is formed of part of the thin plate band having a given thickness which is bent in the thickness direction. Further, the projections are symmetrically disposed with respect to the center of the width of the thin plate band. The projection is formed in any shape of dot, linear and plane shapes in front view.

In the present invention, it is desirable that a longitudinally elongated projection which extends in a length direction of the thin plate band and a laterally elongated projection which extends in the width direction of the thin plate band are provided at the end positions. In this case, the longitudinally elongated projection and the laterally elongated projection may be provided as separate members which are gathered together or are combined into one and provided as a composite.

It is desirable that a plurality of and the same number of longitudinally elongated projections and laterally elongated projections are disposed on each of the end positions on one end and the other end of the thin plate band.

According to another preferable embodiment of the present invention, the thin plate band includes the projections in the end positions and the intermediate position, and the projections in the intermediate position are symmetrically disposed with respect to the center in the length direction of the thin plate band.

Further, it is desirable that the thin plate band includes a non-projection forming area which is located between the projections of the end positions and the projections of the intermediate position and is in pressing contact with a surface of the cylinder tube when the thin plate band is wound around the outer periphery of the cylinder tube, and that the non-projection forming area has a length of 50% or more of the peripheral length of the cylinder tube.

Advantageous Effects of Invention

According to the position sensor attachment band of the present invention, it is possible to apply a stable securing force of a sufficient magnitude to secure a position sensor by providing the projections which project from the inner peripheral surface of the thin plate band at appropriate positions. Further, the position sensor attachment band can be manufactured with a small number of components and with a simple manufacturing process, thereby reducing the manufacturing cost. Moreover, the position sensor attachment band has a simple configuration and is easily removably attached to the cylinder tube, which allows the adjustment of the position sensor in the axial direction and the circumferential direction on the cylinder tube to be easily performed.

DESCRIPTION OF EMBODIMENTS

FIGS. 1(a) and 1(b) show a hydraulic pressure cylinder 30 on which a position sensor attachment band 10 according to the present invention is mounted.

Figure 1:
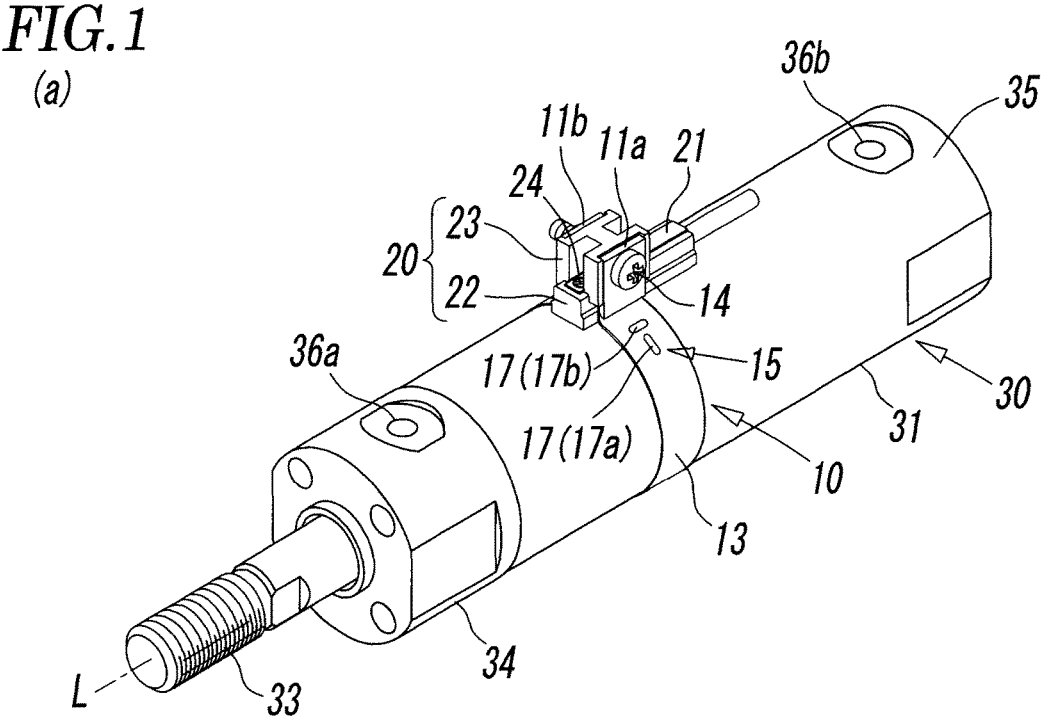
FIG. 1(a) is a perspective view of an example in which a position sensor is mounted on a hydraulic pressure cylinder via a position sensor attachment band according to the present invention.
FIG. 1(b) is a sectional view of the hydraulic pressure cylinder at a mounting position of the position sensor attachment band.
Figure 1:
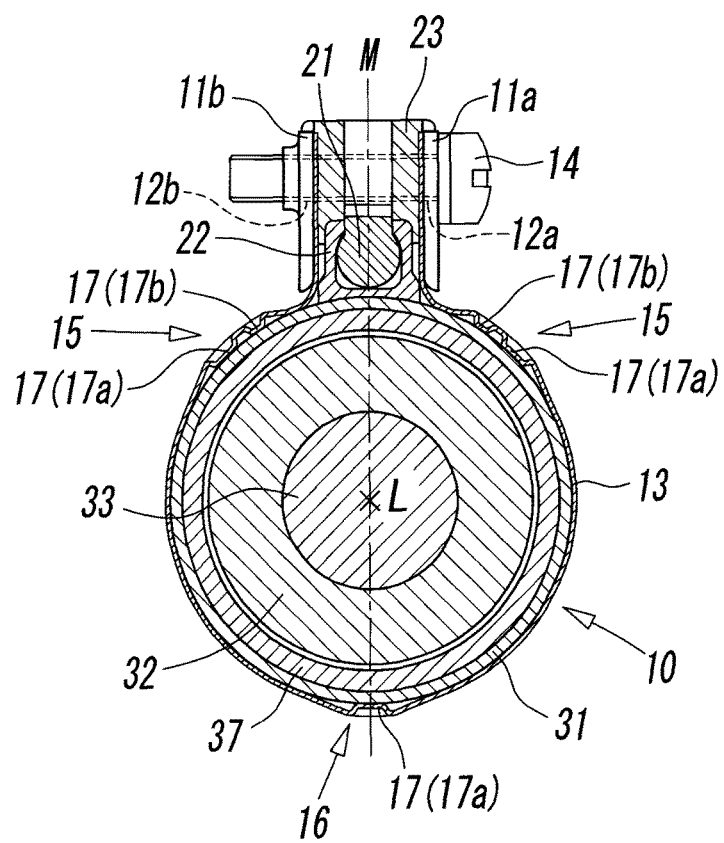
Figure 12:
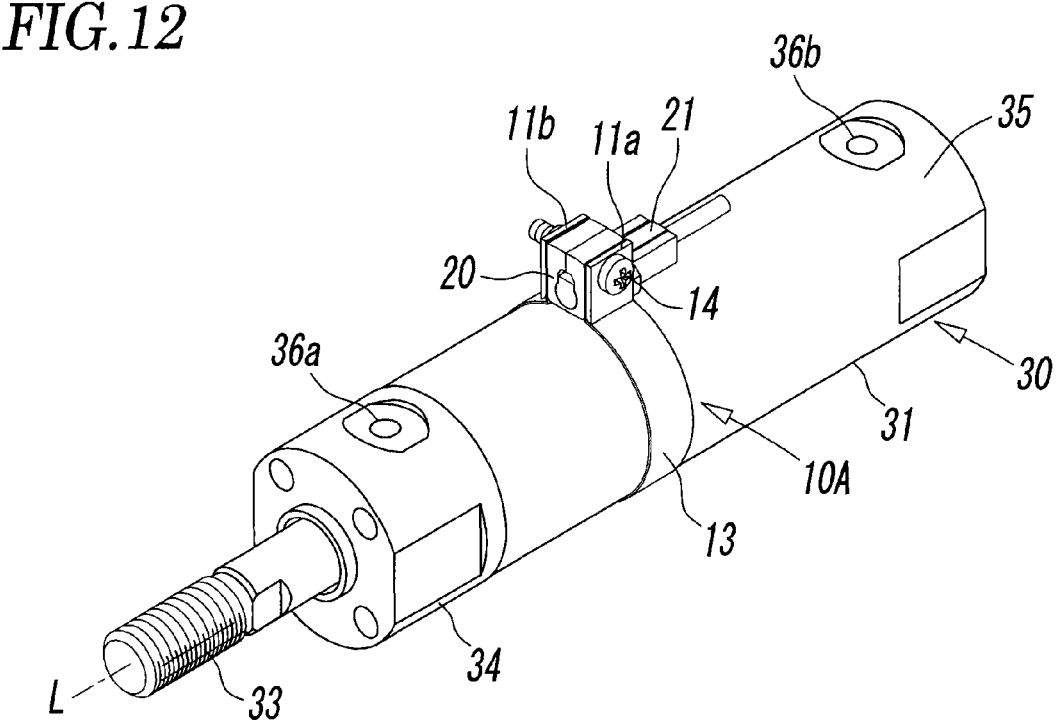
FIG. 12 is a perspective view which shows that the position sensor is mounted on the hydraulic pressure cylinder via a position sensor attachment band of prior art.
Figure 13:
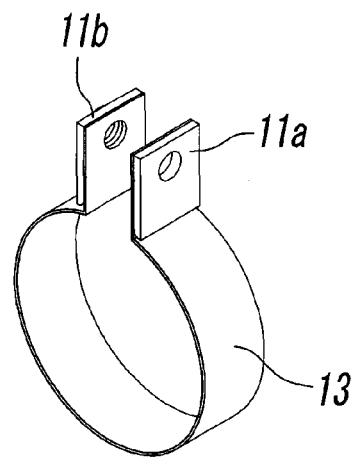
FIG. 13 is a perspective view of the position sensor attachment band of prior art.

In the hydraulic pressure cylinder shown in FIG. 1, the parts which are the same as or corresponding to those of the hydraulic pressure cylinder in FIG. 12 are denoted by the same reference numbers as those of FIG. 12 and the description of those parts will be omitted. In the position sensor attachment band 10 according to the present invention shown in FIG. 1, the parts corresponding to those of the position sensor attachment band 10A of prior art shown in FIGS. 12 and 13 are denoted by the same reference numbers for convenience of description, while the parts different from those shown in FIGS. 12 and 13 are denoted by different reference numbers and the configuration of the position sensor attachment band 10 according to the present invention will be described below in detail.

First, a position sensor 21 which is mounted on the outer surface of a cylinder tube 31 via the position sensor attachment band 10 according to the present invention is a magnetic sensitive type sensor that detects the operating position of a piston 32 in the cylinder tube 31 by using magnetism of a permanent magnet 37 which is disposed around the piston 32. Further, the position sensor attachment band 10 includes a thin plate band 13 formed as a strip shaped flexible metal plate for securing a holding member 20 that holds the position sensor 21 on a certain position on the outer periphery of the cylinder tube 31. The thin plate band 13 is wound around the outer periphery of the cylinder tube 31 with the holding member 20 interposed between both ends of the thin plate band 13. Accordingly, in the embodiment shown in the figure, the position sensor attachment band 10 can be regarded as composed of the thin plate band 13 and the holding member 20.

The thin plate band 13 of the position sensor attachment band 10 shown in FIG. 1 includes reinforced clamp members 11(a), 11(b) on both ends of the thin plate band 13 so as to clamp the holding member 20. The holding member 20 clamped by the opposed clamp members 11(a), 11(b) include a sensor holder 22 which is in pressing contact with the outer periphery of the cylinder tube 31 so as to receive the position sensor 21, and a mount member 23 which is located on the sensor holder 22 and presses the sensor holder 22 against the outer periphery of the cylinder tube 31 so that the position sensor 21 is secured to the sensor holder 22 by a fixation screw 24 which is inserted into a mount groove of the sensor holder 22. The position sensor 21 and the holding member 20 are secured on the outer periphery of the cylinder tube 31 by clamping both sides of the mount member 23 by using the clamp member 11(a) and the clamp member 11(b), inserting a mount screw 14 into a screw insertion hole of the mount member 23 through a screw hole 12a of the clamp member 11(a), and threadably inserting the mount screw 14 into a screw fastening hole 12b of the clamp member 11(b).

The thin plate band 13 is formed by bending the strip shaped metal plate having a given thickness into a circular arc shape. In order to increase a securing force of the thin plate band 13 to the outer surface of the cylinder tube 31, a plurality of projections 17 are formed by press working in which part of the thin plate band 13 is plastically deformed in the thickness direction so that the projections 17 project from the inner peripheral surface of the thin plate band 13.

The projections 17 are not uniformly distributed over the entire thin plate band 13, but are gathered together at least at the end positions of the thin plate band 13 among the end positions which are in proximity to one end and the other end of the thin plate band 13 in the length direction and the intermediate position which is located at or around the center of the thin plate band 13 in the length direction. Although FIG. 1(b) shows that the projections 17 are formed at both the end positions and the intermediate position, the projections 17 at the intermediate position may not be provided.

Two projections 17 are gathered in proximity to each other at each of the end positions. One of the two projections 17 is a longitudinally elongated projection 17a which extends in the length direction of the thin plate band 13, while the other is a laterally elongated projection 17b which extends in the width direction of the thin plate band 13.

In the following description, all the projections are denoted by the reference number 17 except for a case in which the longitudinally elongated projection 17a and the laterally elongated projection 17b are individually identified. Further, a portion in which the projections 17 at the end positions and the intermediate position are formed are referred to as a projection forming section 15 and a projection forming section 16, respectively.

As shown in FIG. 1(b), a pair of projection forming sections 15, 15 formed at both end positions on both ends of the thin plate band 13 are disposed at symmetric positions on both sides of the center of the holding member 20, that is, on both sides of a virtual plane M which extends through the center of the holding member 20 and the axial line L. Further, the pair of projection forming sections 15, 15 is disposed on a portion of the thin plate band 13 wound around the cylinder tube 31 on the half-circumference of the cylinder tube in which the holding member is located (in the proximity of the both ends of the thin plate band 13). The projections 17 of the pair of projection forming sections 15, 15 are symmetrically arranged and shaped with respect to the center in the length direction of the thin plate band, and, as shown in FIG. 3(a), are desirably symmetrically arranged and shaped with respect to a center line N which extends in the longitudinal direction of the thin plate band through the center position in the width direction of the thin plate band 13. This also applies to the projections 17 in the projection forming section 16.

The longitudinally elongated projection 17a provides a large securing force against the thin plate band 13 when the external force is applied in the direction of the axial line L of the cylinder tube 31, while the laterally elongated projection 17b provides a large securing force against the thin plate band 13 when the external force is applied in the direction of the circumference of the cylinder tube 31.

Figure 2:
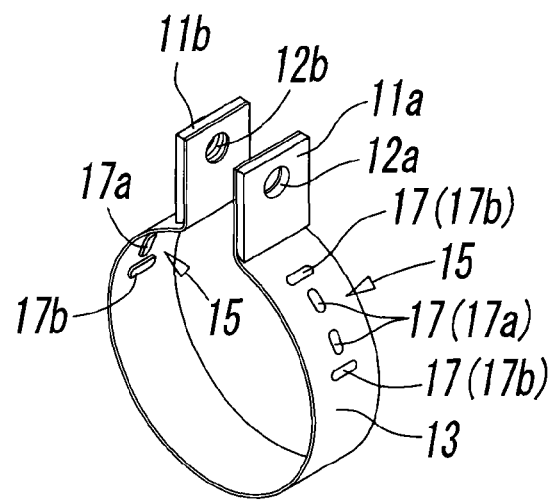
FIG. 2 is a perspective view of another example of preferable configuration of a thin plate band of the position sensor attachment band according to the present invention.

When the thin plate band 13 having the projections 17 disposed on part of the inner peripheral surface as described above is wound around and fastened to the outer periphery of the cylinder tube 31, the fastening force is concentrated to the respective tips of the projections 17 in the projection forming sections 15 and the fastening force is applied on the outer periphery of the cylinder tube 31, thereby generating a large securing force. Further, when the projection forming sections 15 that generate the securing force are arranged at symmetric positions on both sides of the holding member 20 as described above, securing of the position sensor 21 by the holding member 20 is performed on both sides of the holding member 20, which allows securing of the holding member 20 to be sufficiently stabilized. In particular, as shown in FIG. 2, when a plurality of longitudinally elongated projections 17a and a plurality of laterally elongated projections 17b are disposed in the projection forming sections 15, 15 at the end positions, securing force applied on the holding member 20 in the directions of the circumference and the axial line L of the cylinder tube 31 can be effectively improved.

For example, in the case where the cylinder tube 31 has a large diameter and thus the thin plate band 13 has a long length, stable securing of the thin plate band 13 may not be possible only with the projection forming sections 15, 15 of the end positions of the thin plate band 13. In such a case, in addition to the projection forming sections 15, 15 of the end positions of the thin plate band 13, the projection forming section 16 in which one or more projections 17 are disposed at the intermediate position of the longitudinal direction of the thin plate band 13 so as to project from the inner peripheral surface of the thin plate band 13 can be provided as shown in the figures such as FIGS. 1(*b*), 4, 7, 8, 10. However, if a number of projection forming sections are distributed over the entire thin plate band 13, securing force is distributedly applied on a number of projection forming sections and the distributed securing force does not always firmly secure the holding member 20.

Accordingly, when the projection forming section 16 is disposed at the intermediate position of the longitudinal direction of the thin plate band 13 in addition to the projection forming sections 15, 15 on both sides of the holding member 20, it is necessary that a sufficient length of the thin plate band 13 is in pressing contact with the surface of the cylinder tube 31 between the projection forming sections 15, 15 on both sides of the holding member 20 and the projection forming section 16 at the intermediate position during fastening of the thin plate band 13 on the outer periphery of the cylinder tube 31. Accordingly, it is possible to prevent the securing force applied on each of the projection forming sections 15, 16 from being distributed due to the fastening force applied on the thin plate band 13, compared with the case where a number of projection forming sections are disposed over the entire thin plate band 13, thereby allowing a sufficiently large securing force to be applied.

The inventors of the present invention have found the pressing contact length necessary for allowing a sufficient length of the thin plate band 13 to be in pressing contact with the surface of the cylinder tube 31 based on the examination results. When the cylinder tube 31 has a large diameter and thus the thin plate band 13 has a long length, the length of the thin plate band 13 in the range of 70-80% of the peripheral length of the cylinder tube 31 can be easily pressing contact with the surface of the cylinder tube 31 during fastening of the thin plate band 13 on the periphery of the cylinder tube 31. When the cylinder tube 31 has a small diameter and thus the thin plate band 13 has a short length, it is difficult to obtain a sufficient length for the thin plate band 13 to be in pressing contact with the surface of the cylinder tube 31 between the projection forming sections 15, 15 of the end positions and the projection forming section 16 of the intermediate position, however the length of the thin plate band 13 to be in pressing contact with the surface of the cylinder tube 31 needs to be at least 50% or more of the peripheral length of the cylinder tube 31.

The projections 17 in the projection forming section 16 at the intermediate position are symmetrically disposed with respect to the center of the longitudinal direction of the thin plate band 13 and the center of the width direction of the thin plate band 13, similarly to the projections 17 in the projection forming sections 15 at the end positions.

Figure 9:
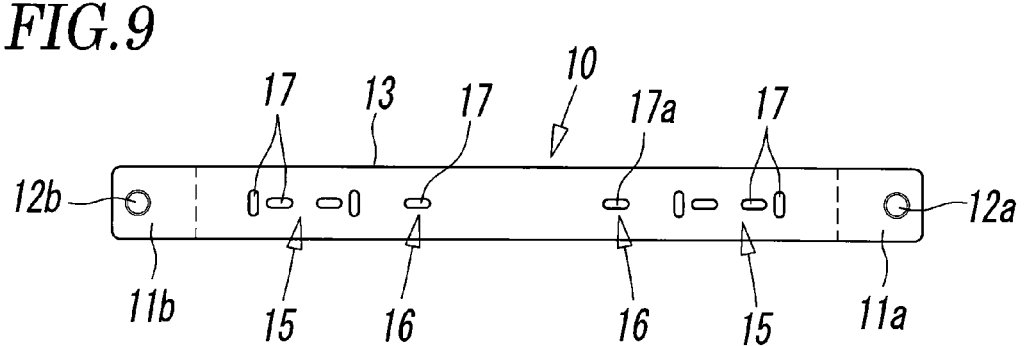
FIG. 9 is a developed view of the inner face of the thin plate band which shows still another projection pattern of the linear projections disposed on the thin plate band.

In the case where the projection forming section 16 of the intermediate position is provided in addition to the projection forming section 15 of the end positions, the projection forming section 16 is not necessarily disposed at the center of the longitudinal direction of the thin plate band 13 as shown in the figures such as FIGS. 1(*b*), 4, 7, 8, 10. As long as the length of the thin plate band 13 to be in pressing contact with the surface of the cylinder tube 31 being 50% or more of the peripheral length of the cylinder tube 31, the necessary number of projection forming section 16 may be disposed around the center of the longitudinal direction of the thin plate band 13 as shown in FIG. 9.

Figure 3:
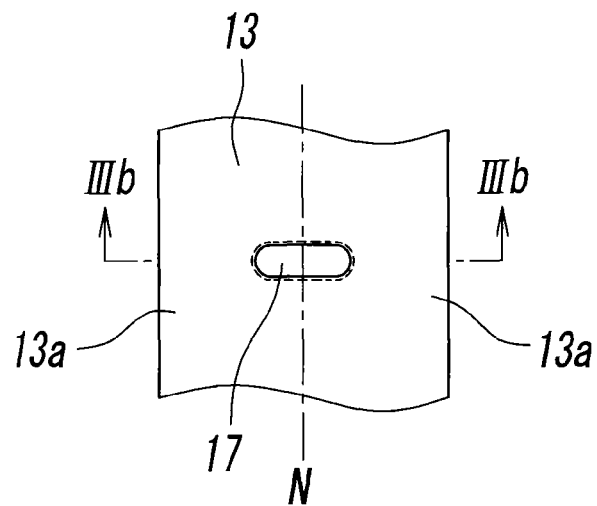
FIG. 3(a) is a partial enlarged developed view of an inner face of the thin plate band of FIG. 2 with a plurality of linear projections being disposed.
FIG. 3(b) is a sectional view taken along the line IIIb-IIIb when the thin plate band is fastened on the cylinder tube.
Figure 3:
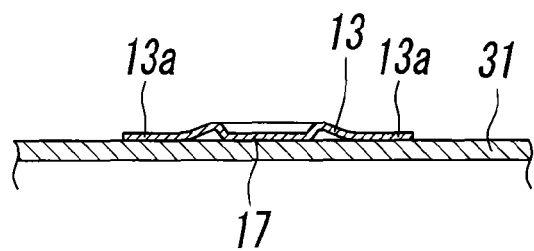

In the case where the projection forming sections 15, 16 are provided on thin plate band 13, it is desirable that the projections 17 in the projection forming sections 15, 16 are disposed at positions completely within the width of the thin plate band 13, preferably at the center of the width direction of the thin plate band 13 as shown in FIG. 3, and accordingly, that the projections 17 are disposed at positions completely away from the both side edges 13(*a*) of the thin plate band 13 on both sides in the width direction so that the both side edges 13(*a*) of the thin plate band 13 in the width direction at the projection forming sections 15, 16 are in pressing contact with the cylinder tube 31 during fastening of the thin plate band 13 on the cylinder tube 31. With this configuration, the projections 17 are in pressing contact with the cylinder tube 31 in a stabilized manner, thereby allowing the projections to generate more stable securing force. In this case, it is desirable that the projection forming sections 15, 16 located at the center in the width direction of the thin plate band 13 are disposed within the range of a half or less of the width of the thin plate band 13 and that a flat non-projection forming area, that is, a flat section having a width of one-fourth or more of the width of the thin plate band 13 are provided on each side of the projection forming section 15, 16.

Next, with reference to FIGS. 4-11, other specific details of the projections 17 which are disposed in the projection forming sections 15, 16 will be described.

Figure 4:
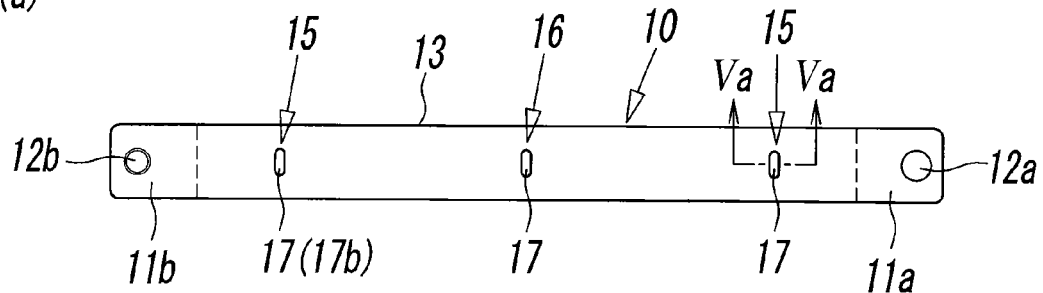
FIGS. 4(a)-4(d) are developed views of the inner face of the thin plate band with various patterns of the linear projections being disposed.
Figure 4:
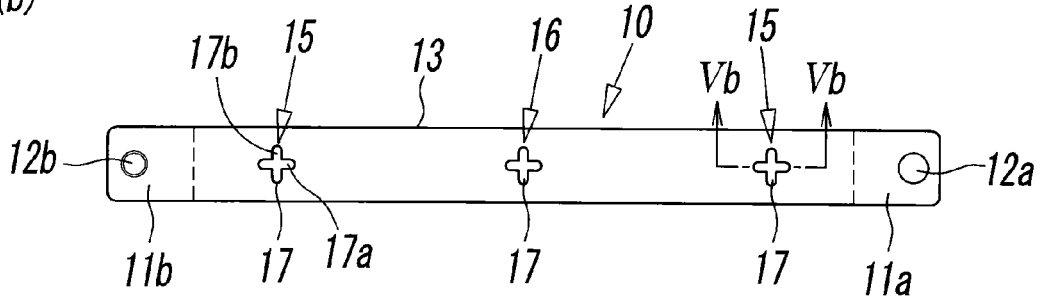
Figure 4:
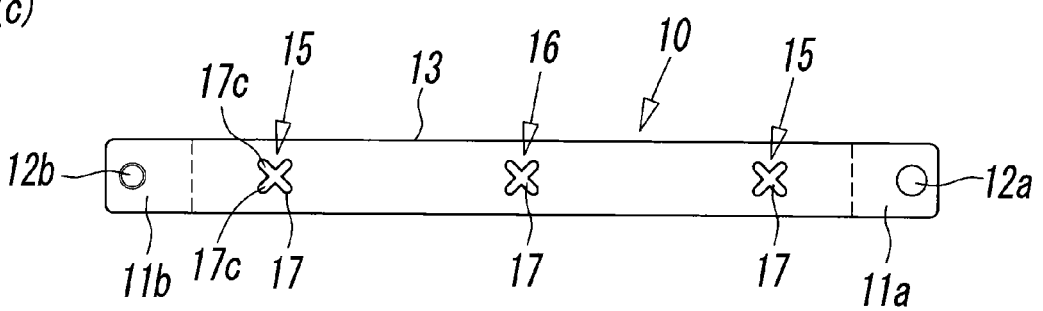
Figure 4:
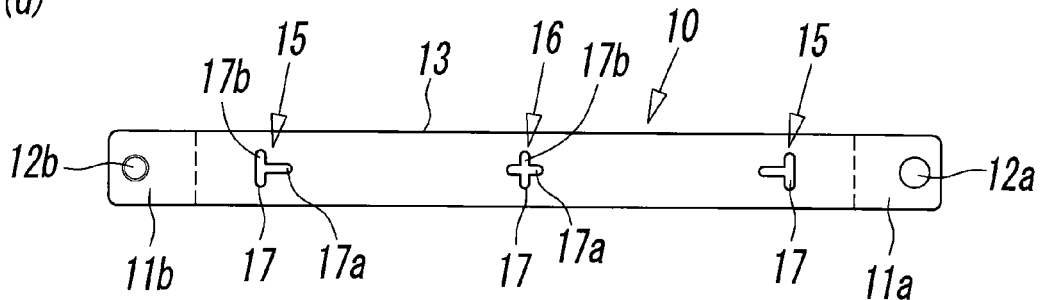
Figure 5:
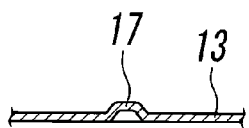
FIG. 5(a) is a sectional view of the thin plate band of FIG. 4(a) taken along the line Va-Va.
FIG. 5(b) is a sectional view of the thin plate band of FIG. 4(b) taken along the line Vb-Vb.
Figure 5:
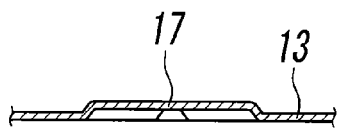

FIGS. 4(*a*)-4(*d*) are views which show that a single linear projection 17 or a single projection formed as a composite of a plurality of linear projections 17a, 17b is disposed in each of the projection forming sections 15, 16 of the thin plate band 13. FIG. 4(*a*) shows that one laterally elongated projection 17b which extends in the width direction of the thin plate band 13 is disposed in each of the projection forming sections 15, 16, FIG. 4(*b*) shows that the projection 17 formed as a composite in a cross shape composed of the laterally elongated projection 17b and the longitudinally elongated projection 17a which extends in the longitudinal direction of the thin plate band 13 is disposed in each of the projection forming sections 15, 16, FIG. 4(c) shows that the projection 17 formed as a composite in X-shape composed of two oblique projections 17c each of which are inclined in the opposite directions with respect to the longitudinal direction of the thin plate band 13 is disposed in each of the projection forming sections 15, 16, and FIG. 4(d) show that the projection 17 formed as a composite in T-shape composed of the laterally elongated projection 17b and the longitudinally elongated projection 17a is disposed in each of the projection forming sections 15 at the end positions, and the projection 17 formed as a composite in a cross shape composed of the laterally elongated projection 17b and the longitudinally elongated projection 17a is disposed in the projection forming section 16 at the intermediate position.

In the embodiment shown in FIGS. 4(b)-4(d), each projection 17 has a linear component in the longitudinal direction and a linear component in the width direction of the thin plate band 13. Accordingly, those projections 17 allow the securing force at the holding member 20 in the circumferential direction and the axial direction of the cylinder tube 31 to be effectively improved.

The longitudinally elongated projection 17a can be also regarded as a projection having only a linear component in the longitudinal direction of the thin plate band 13, while the laterally elongated projection 17b can be also regarded as a projection having only a linear component in the width direction of the thin plate band 13.

Moreover, FIGS. 6-11 show embodiments in which a plurality of projections 17 are disposed in each of the two projection forming sections 15 at the end positions.

Figure 6:
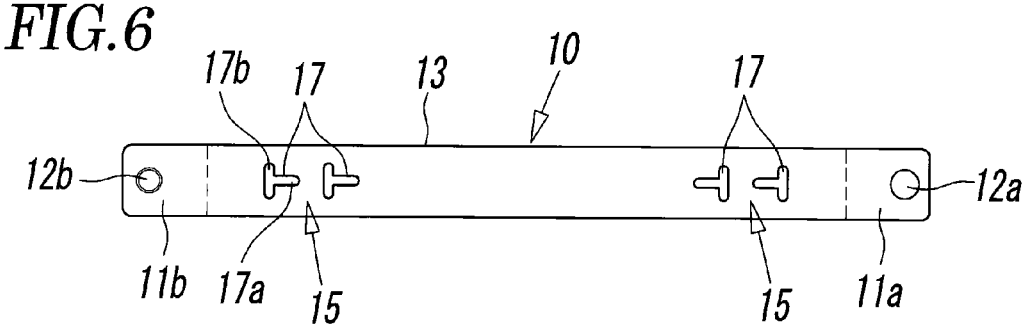
FIG. 6 is a developed view of the inner face of the thin plate band which shows another projection pattern of the linear projections disposed on the thin plate band.
Figure 7:
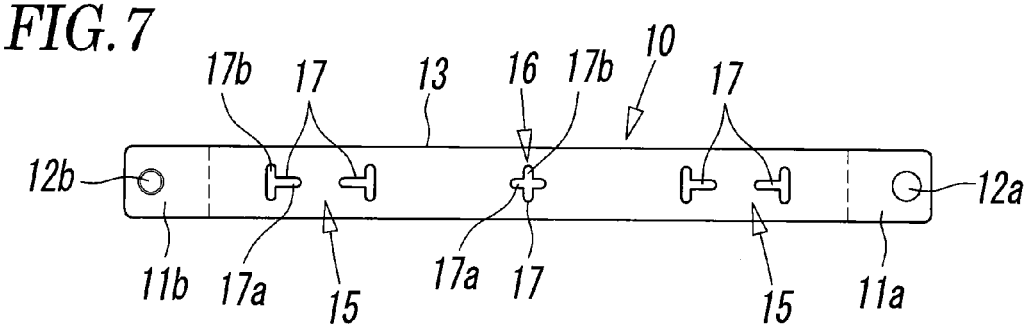
FIG. 7 is a developed view of the inner face of the thin plate band which shows still another projection pattern of the linear projections disposed on the thin plate band.

FIG. 6 shows that two projections 17 each formed as a composite in T-shape composed of the longitudinally elongated projection 17a and the laterally elongated projection 17b are disposed with the longitudinally elongated projection 17a being toward the center in the longitudinal direction of the thin plate band 13 in each of the projection forming sections 15 at the end positions, FIG. 7 shows that two projections 17 each formed as a composite in T-shape are disposed with the longitudinally elongated projection 17a being toward each other in each of the projection forming sections 15 at the end positions and one projection 17 formed as a composite in a cross shape composed of the longitudinally elongated projection 17a and the laterally elongated projection 17b is disposed in the projection forming section 16 at the intermediate position.

Figure 8:
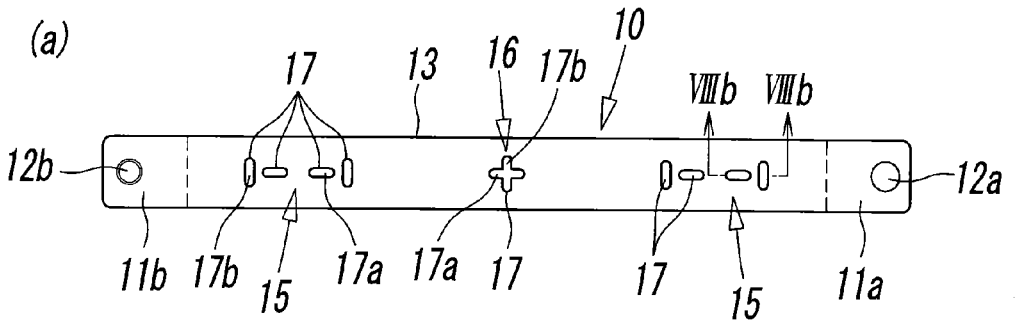
FIG. 8(a) is a developed view of the inner face of the thin plate band which shows still another projection pattern of the linear projections disposed on the thin plate band.
FIG. 8(b) is a sectional view taken along the line VIIIb-VIIIb.
Figure 8:
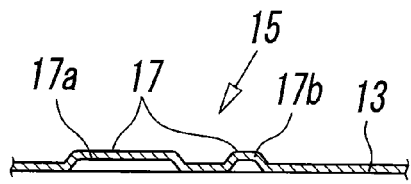

Further, FIG. 8 shows that two longitudinally elongated projections 17a and two laterally elongated projections 17b are gathered with the two longitudinally elongated projections 17a being interposed between the two laterally elongated projections 17b in each of the projection forming sections 15 at the end positions and the projection 17 formed as a composite in a cross shape composed of the longitudinally elongated projection 17a and the laterally elongated projection 17b is disposed in the projection forming section 16 at the intermediate position, and FIG. 9 shows that the projections 17 in the same arrangement as that of FIG. 8 are disposed in each of the projection forming section 15 at the end positions and one longitudinally elongated projection 17a is disposed in each of a plurality of (two) projection forming sections 16 at the intermediate position which are symmetrically arranged with respect to the center in the longitudinal direction of the thin plate band 13. When a plurality of projections 17 are gathered in proximity, it is desirable that the adjacent projections 17 are arranged to allow their own functions to be fully performed. Specifically, a configuration in which the laterally elongated projections 17b having a linear component in the width direction of the thin plate band 13 are adjacent to each other is not desirable since it does not always improve the securing force at the holding member 20 in the circumferential direction of the cylinder tube 31 compared with the case in which the projections are spaced apart from each other.

In the embodiments shown in FIGS. 4 and 6-9, the projections 17 having a linear component in the longitudinal direction of the thin plate band 13 and projections 17 having a linear component in the width direction which are provided as separate members which are gathered together or combined into an integrally formed composite in each of the projection forming sections 15, 16. However, the projections 17 may be formed in any shape other than the above described shapes, such as the shape of any alphabetic letter.

Figure 10:
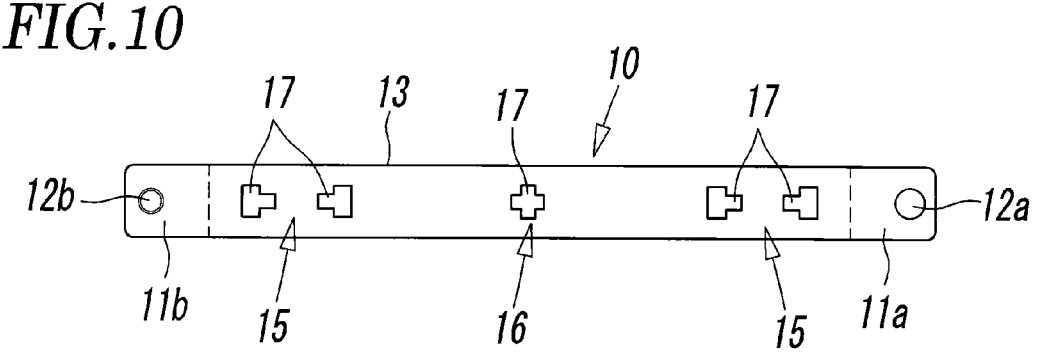
FIG. 10 is a developed view of the inner face of the thin plate band which shows a projection pattern of plane shaped projections disposed on the thin plate band.
Figure 11:
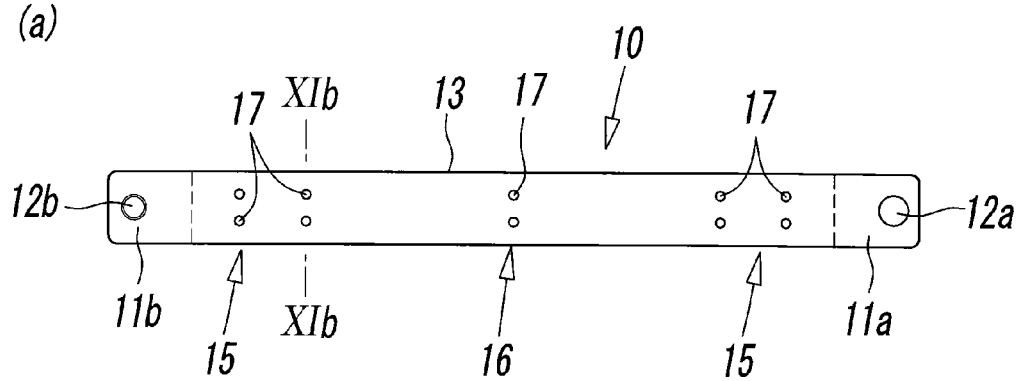
FIG. 11(a) is a developed view of the inner face of the thin plate band which has projection forming sections in which dot shaped projections are disposed at two positions in the width direction.
FIG. 11(b) is a sectional view of the thin plate band taken along the line XIb-XIb.
Figure 11:
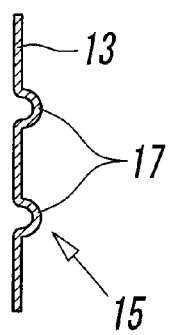

FIG. 10 shows the embodiment in which the projections 17 in a plane shape to be in surface contact with the cylinder tube 31 are disposed in each of the projection forming sections 15, 16. The plane shaped projections 17 have a plane shaped contact area with the cylinder tube 31 and the press contact force per unit surface area at the contact area is smaller than that of the linear projections. Accordingly, although it is not effective to increase the securing force of the thin plate band 13 to the cylinder tube 31, it is effective to limit a pressing force of the projection per unit surface area to some extent, for example due to a strength problem of the cylinder tube 31.

FIGS. 11(a) and 11(b) show that a plurality of dot shaped projections 17 to be in point contact with the cylinder tube 31 are disposed in each of the projection forming sections 15, 16. That is, two pairs of projections, each pair composed of two projections 17 disposed at two positions in the width direction of the thin plate band 13, are arranged side by side in the longitudinal direction of the thin plate band 13 in each of the projection forming sections 15 at the end positions of the thin plate band 13, and a pair of projections is disposed at the center in the longitudinal direction of the thin plate band 13. In this configuration, with a simple form of dot shaped projection 17, both side edges 13(a) which extend in the longitudinal direction of the thin plate band 13 on both sides of the projections 17 in the width direction can be in pressing contact with the cylinder tube 31 during fastening of the thin plate band 13 on the cylinder tube 31, for example as shown in FIG. 3, which allows securing of the thin plate band 13 on the cylinder tube 31 to be stabilized.

In the above described embodiments of the thin plate band 13, the projection forming sections 15 provided at symmetric positions on both sides of the holding member 20 are formed of one or more projections which are symmetrically arranged on both sides of the center of the holding member 20. This configuration is effective to equalize the securing force on both sides of the holding member 20 and stabilize the securing.

Moreover, the projection forming sections 15 provided at symmetric positions on both sides of the holding member 20 are symmetrically arranged on both sides of the center of the holding member 20. This is also effective for manufacturing of the thin plate band 13 since both ends of the thin plate band 13 can be formed by press work using the same die, thereby reducing the manufacturing cost.

REFERENCE SIGNS LIST 10 position sensor attachment band
13 thin plate band
13(a) side edge
17, 17a, 17b projection 20 holding member
21 position sensor
31 cylinder tube

The invention claimed is:

1. A position sensor attachment band to secure a position sensor that detects an operating position of a piston on an outer periphery of a cylinder tube, comprising:
a sensor holding member to hold the position sensor;
a thin plate band including a belt-shaped metallic plate wound around the outer periphery of the cylinder tube, the sensor holding member being interposed between both ends of the thin plate band, wherein the thin plate band has an inner peripheral surface that abuts against the outer periphery of the cylinder tube and one or more projections formed directly on the thin plate and that project from the inner peripheral surface disposed at least at end positions among end positions located in proximity to one end and the other end of the thin plate band in a length direction and an intermediate position located at or around a center in the length direction of the thin plate band, and the one or more projections are disposed at positions completely within a width of the thin plate band and accordingly at positions completely away from both side edges of the thin plate band on both sides in a width direction, and the one or more projections are symmetrically disposed with respect to the center in the length direction of the thin plate band.

2. The position sensor attachment band according to claim 1, wherein the one or more projections disposed at the end positions on one end and the other end of the thin plate band are located on a half-circumference of the cylinder tube in which the holding member is located when the thin plate band is wound around the outer periphery of the cylinder tube, and are disposed at symmetric positions with the holding member interposed therebetween.

3. The position sensor attachment band according to claim 1, wherein the one or more projections are disposed at a center of the width of the thin plate band, thereby allowing the both side edges of the thin plate band in the width direction on both sides of the one or more projections to be in pressing contact with the cylinder tube during fastening of the thin plate band on the periphery of the cylinder tube.

4. The position sensor attachment band according to claim 3, wherein the one or more projections are disposed within the range of a half or less of the width of the thin plate band and accordingly a flat non-projection forming area having a width of one-fourth or more of the width of the thin plate band is provided on each side of a position of the thin plate band where the one or more projections are formed.

5. The position sensor attachment band according to claim 1, wherein the one or more projection is formed of part of the thin plate band having a given thickness which is bent in a thickness direction.

6. The position sensor attachment band according to claim 1, wherein the one or more projections are symmetrically disposed with respect to a center of the width of the thin plate band.

7. The position sensor attachment band according to claim 1, wherein the projection is formed in any shape of a dot, linear and plane shapes in a front view.

8. The position sensor attachment band according to claim 1, wherein a longitudinally elongated projection which extends in the length direction of the thin plate band and a laterally elongated projection which extends in the width direction of the thin plate band are disposed at the end positions, and the longitudinally elongated projection and the laterally elongated projection are separate members which are together or are combined into one as a composite.

9. The position sensor attachment band according to claim 8, wherein a plurality of and a same number of longitudinally elongated projections and laterally elongated projections are disposed on each of the end positions on one end and the other end of the thin plate band.

10. The position sensor attachment band according to claim 1, wherein the thin plate band includes the one or more projections in the end positions and the intermediate position, and the one or more projections in the intermediate position are symmetrically disposed with respect to the center in the length direction of the thin plate band.

11. The position sensor attachment band according to claim 10, wherein the thin plate band includes a non-projection area which is located between the one or more projections of the end positions and the one or more projections of the intermediate position and is in pressing contact with a surface of the cylinder tube when the thin plate band is wound around the outer periphery of the cylinder tube, and the non-projection area has a length of 50% to 80% of a peripheral length of the cylinder tube.

* * * * *